United States Patent
Jang et al.

(10) Patent No.: US 7,539,506 B2
(45) Date of Patent: May 26, 2009

(54) METHOD OF CONTROLLING POWER OF WIRELESS ACCESS NODE IN A WIRELESS LAN SYSTEM

(75) Inventors: Kyung-Hun Jang, Suwon-si (KR); Ok-Seon Lee, Seoul (KR); Tae-Jin Lee, Suwon-si (KR); Duck-Yong Yang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 441 days.

(21) Appl. No.: 10/793,581

(22) Filed: Mar. 4, 2004

(65) Prior Publication Data
US 2004/0180652 A1 Sep. 16, 2004

(30) Foreign Application Priority Data
Mar. 13, 2003 (KR) ...................... 10-2003-0015849

(51) Int. Cl.
*H04B 7/00* (2006.01)
(52) U.S. Cl. .................. 455/522; 455/426.2; 455/554.2
(58) Field of Classification Search .................... 455/69, 455/127.1, 422.1, 426.2, 517, 522, 550, 554.2; 370/335, 342, 449
See application file for complete search history.

(56) References Cited

U.S. PATENT DOCUMENTS

| | | | | |
|---|---|---|---|---|
| 5,732,328 | A * | 3/1998 | Mitra et al. | 455/522 |
| 6,230,023 | B1 * | 5/2001 | Slanina | 455/522 |
| 6,252,865 | B1 * | 6/2001 | Walton et al. | 370/335 |
| 6,856,812 | B1 * | 2/2005 | Budka et al. | 455/522 |
| 2002/0018008 | A1 * | 2/2002 | Wright et al. | 340/945 |
| 2003/0100328 | A1 * | 5/2003 | Klein et al. | 455/522 |
| 2004/0066795 | A1 * | 4/2004 | Zhang | 370/442 |

FOREIGN PATENT DOCUMENTS

| | | |
|---|---|---|
| JP | 07-087093 | 3/1995 |
| JP | 2002-044099 | 2/2002 |
| JP | 2002-261687 | 9/2002 |

\* cited by examiner

*Primary Examiner*—Quochien B Vuong
(74) *Attorney, Agent, or Firm*—McNeely Bodendorf LLP

(57) ABSTRACT

A power control method in a wireless access node communicable with a plurality of wireless terminals in a wireless LAN system. Upon request for initial communication from a wireless terminal, the wireless access node transmits a power report request message to the plurality of wireless terminals and determines its transmit power based on a power report signal requesting the highest power among power report signals received from connected wireless terminals. The wireless access node communicates with the connected wireless terminals using the determined transmit power.

6 Claims, 4 Drawing Sheets

METHOD OF CONTROLLING POWER OF WIRELESS ACCESS NODE IN A WIRELESS LAN SYSTEM

PRIORITY

This application claims priority under 35 U.S.C. § 119 to an application entitled "Method of Controlling Power of Wireless Access Node in a Wireless LAN System" filed in the Korean Intellectual Property Office on Mar. 13, 2003 and assigned Serial No. 2003-15849, the contents of which are incorporated herein by reference.

BACKGROUND OF THE INVENTION

1. Field of the Invention

The present invention relates generally to a power control method in a wireless communication system for transmitting data wirelessly, and in particular, to a power control method in a wireless LAN (Local Area Network) system.

2. Description of the Related Art

In general, wireless communication systems are categorized into mobile communication systems and fixed wireless systems. A mobile communication system enables a user to communicate through a portable terminal while moving, whereas a fixed wireless communication system only allows the user terminal to communicate in while a fixed state. Although the fixed wireless system need not be fixed all the time, it must be situated at a fixed location during communication. WLL (Wireless Local Loop) and wireless LAN systems are examples of the fixed wireless systems. Fixed wireless communications occur usually within confines of a household. Fixed wireless systems are expected to account for a higher proportion of future wireless communication systems.

As described above, wireless access is usually made while the user is within confines of the household and a plurality of wireless terminals access a wired network via a wireless access node in the wireless communication system. In a mobile communication system, a mobile terminal is not confined to one particular node. As it roams, it is connected to varying nodes and accesses the wired network via these nodes. A typical mobile terminal carries a portable power supply such as a battery, to secure its mobility.

Due to the use of a portable power supply, such wireless terminals operate with limited power. Hence, a power mechanism for transmission/reception is significant to the wireless terminals. Meanwhile, the wireless access node is generally in a fixed location to receive power continuously. Therefore, power consumption does not concern the wireless access node and there is no particular need for power control for the wireless access node. That's why the transmit power of the wireless access node is almost fixed. However, if a plurality of households are engaged in wireless communication, excess transmit power of a wireless access node may interfere with the communication areas of other neighbor households. This will be a challenging issue as wireless terminals become widespread to common household use, especially as many wireless terminals are used in a narrow area like apartments. Moreover, if the wireless access node transmits more power than required, the power may leak to neighbors' wireless terminals.

This above described problem will be addressed in more detail with reference to FIG. 1. FIG. 1 illustrates deployment of a single wireless access point (AP) in each of the adjacent households and connection of a plurality of wireless terminals to each wireless AP. Referring to FIG. 1, a first AP 111 is located in a first home (home 1) and a second AP 121 in a second home (home 2). As stated earlier, these APs 111 and 121 transmit data with fixed power. Thus, the wireless coverage area of the first wireless AP 111, that is, the area in which access is enabled by a signal from the first wireless AP 111 reaches, is defined as denoted by reference numeral 110 and the wireless coverage area of the second wireless AP 121 is defined as denoted by reference numeral 120.

Given the coverage areas 110 and 120, a first wireless terminal 112 (wireless terminal 1) and a third wireless terminal 114 (wireless terminal 3), which communicate via the first wireless AP 111, are free of interference from other wireless APs. However, a second wireless terminal 113 (wireless terminal 2) covered by the first AP 111 experiences interference from the second wireless AP 121. A fourth wireless terminal 122 (wireless terminal 4) and a fifth wireless terminal 123 (wireless terminal 5), which communicate via the second AP 121, are free of interference from neighbor wireless APs. However, a sixth wireless terminal 124 (wireless terminal 6) covered by the second AP 121 experiences interference from the first wireless AP 111. The interference is attributed to the fixed transmit power of the wireless APs.

Less power from the second wireless AP 121 in home 2 is sufficient for data transmission. The same applies to home 1. As illustrated in FIG. 2, scaling down of the wireless coverage of the first AP 111 from an area 110a to an area 110b and the wireless coverage of the second AP 121 from an area 120a to an area 120b does not bring interference to signals from other wireless terminals. FIG. 2 illustrates a comparison between the actual coverage areas and optimum coverage areas of wireless APs. As noted from FIG. 2, it is necessary to adjust the transmit power of the wireless APs to such a level that it covers a minimum area sufficient to accommodate all authenticated terminals under a given wireless communication environment.

For this reason, APs with a power control function have been recently developed. However, the power control is performed by an operator's arbitrary setting, or its use is confined to adjustment of the cell area of a wireless AP in, for example, Europe. The conventional power control is not effective in adapting to an ambient environment or changes in the topology of wireless terminals.

SUMMARY OF THE INVENTION

An object of the present invention is to substantially solve at least the above stated problems and/or disadvantages and to provide at least the advantages described below. Accordingly, an object of the present invention is to provide a method of controlling the power of a wireless access node in consideration of the distances to terminals in a wireless communication system like a wireless LAN for short-range communication.

Another object of the present invention is to provide a method of adaptively controlling the power of a wireless access node according to the wireless environment between the wireless access node and terminals in a short-range wireless communication system.

A further object of the present invention is to provide a method of preventing information leakage from a wireless access node to other wireless terminals in a short-range wireless communication system.

Still another object of the present invention is to provide a method of reducing the power consumption of a wireless access node in a short-range wireless communication system.

The above objects are achieved by providing a power control method in a wireless access node communicable with a plurality of wireless terminals in a wireless LAN system. Upon request for initial communication from a wireless terminal, the wireless access node transmits a power report request message to the plurality of wireless terminals (step 1) and determines its transmit power based on a power report signal requesting the highest power among power report signals received from connected wireless terminals (step 2). The wireless access node then communicates with the connected wireless terminals using the determined transmit power (step 3).

In step 1, the wireless access node waits for a time period between a time when the initial communication is requested and a predetermined time for transmitting the power report request message, and transmits the power report request message to the connected wireless terminals.

In step 2, upon receipt of the power report signals, the wireless access node stores values set in the power report signals for the connected wireless terminals in an access list and uses the stored values for a next power adjustment operation.

If no signals are received from a wireless terminal until a time-out signal is detected from delete timers set for the respective connected wireless terminals, the wireless access node decides whether a link between the wireless terminal and the wireless access node has been disconnected. If it is decided that the link between the wireless terminal and the wireless access node has been disconnected, the wireless access node resets the transmit power according to the highest of power levels requested by the connected wireless terminals.

In step 2, the wireless access node can determine the transmit power as the sum of the requested highest power and a predetermined margin.

If a new wireless terminal requests a connection during the communication between the wireless access node and the connected wireless terminals, the wireless access node transmits a power report request signal to the new wireless terminal and resets the transmit power according to the highest of power values set in the power report signals from the connected wireless terminals and a power report signal from the new wireless terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
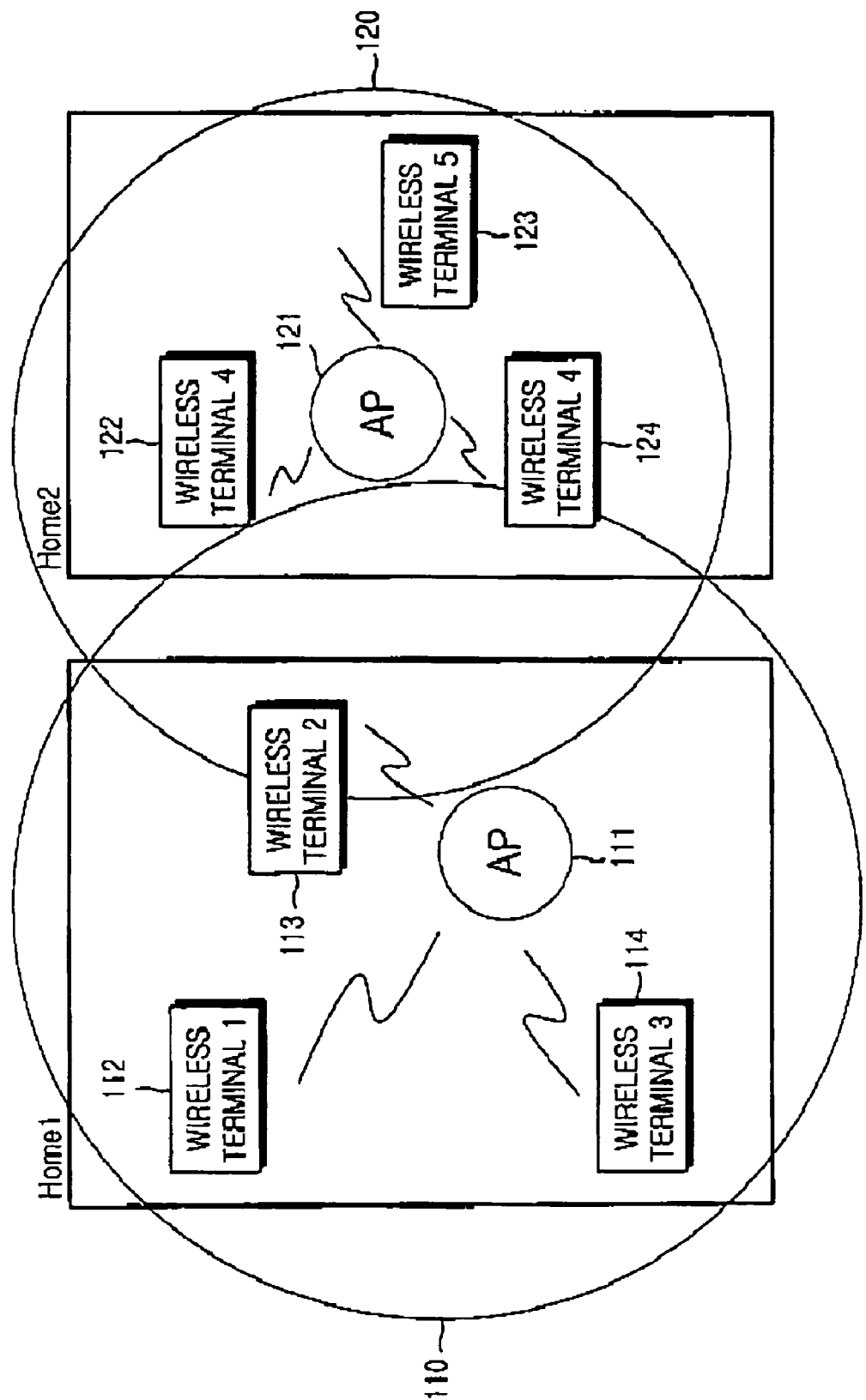
FIG. 1 is a diagram of a wireless communication configuration in which one access point (AP) is located in each adjacent household and a plurality of wireless terminals are connected to the AP.
Figure 2:
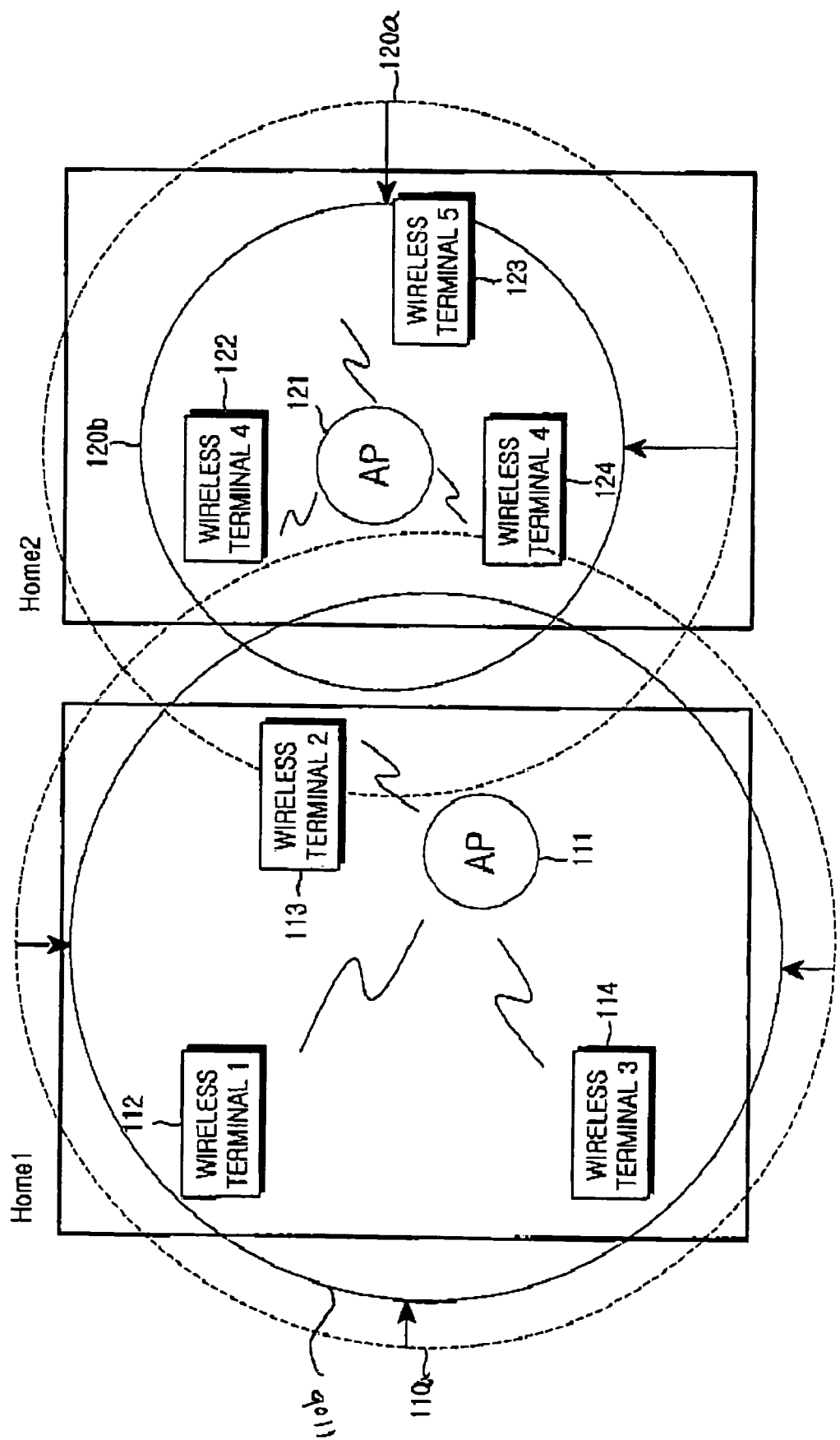
FIG. 2 is a diagram of a wireless communication configuration of FIG. 1, illustrating a comparison between the actual wireless coverage areas and optimum wireless coverage areas of APs.
Figure 3:
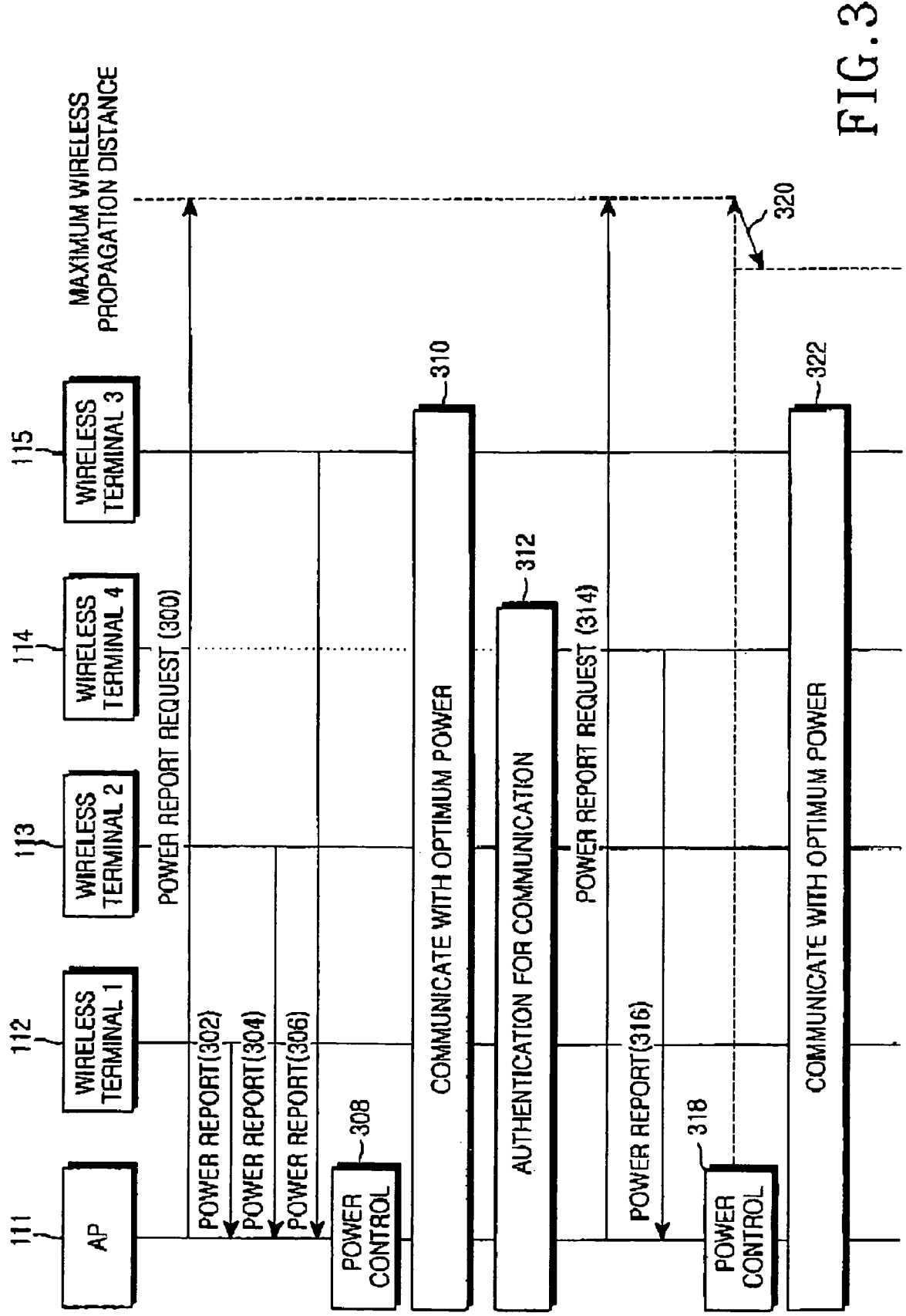
FIG. 3 is a diagram of a signal flow for transmitting data with optimum power to wireless terminals in an AP according to an embodiment of the present invention.

FIG. 3 is a diagram illustrating a signal flow for transmitting data with optimum power to wireless terminals in an access point (AP) according to an embodiment of the present invention. Referring to FIG. 3, the AP 111 transmits a power report request signal to wireless terminals that will access the AP 111 in step 300. If the signal is initially transmitted, the transmit power of the AP 111 can be set to its maximum level as is conventionally done. Thus, the signal is shown to reach a maximum wireless propagation distance in step 300. It is assumed here that first, second and third wireless terminals 112, 113 and 115 receive the signal and a fourth wireless terminal 114 does not because it has not attempted a wireless access or it is in a power-off state. Therefore, the power report request signal is transmitted to the wireless terminals 112, 113 and 115. Notably, the power report request signal is broadcast to all wireless terminals in the present invention. Yet, the power report request signal can be so configured as to be transmitted individually to the wireless terminals. In this case, the AP 111 decides beforehand which wireless terminals to transmit the power report signal and transmits it to the wireless terminals one by one in step 300.

The power report request signal is broadcast to all wireless terminals in step 300. Under the assumption that the wireless terminals 112, 113 and 115 are located farther from the AP 111 in this order and the AP 111 receives power report signals from them, sequentially according to their distances, the AP 111 first receives a power report signal from the wireless terminal. 112 in step 302. The wireless terminal 112 measures the strength of a signal from the AP 111 and reports an increase/decrease in the signal strength to the AP 111, the power level of the received signal, or a margin required to receive the signal, by the power report signal. In the same manner as the wireless terminal 112, the wireless terminals 113 and 115 transmit power report signals in steps 304 and 306, respectively. Instead of the sequential reporting, the power reports may occur concurrently or in a different order. The sequence of power reports does not matter in the present invention.

The power report request and reports sent between the AP 111 and the wireless terminals 112, 113 and 115 can be based on IEEE 802.11 standards. According to the IEEE 802.11 standards, with APs divided into two groups or layers and terminals also divided into two layers, the terminals measure received power and carry out power reporting correspondingly. That is, the power report request and power reporting may be performed between the AP 111 and the individual wireless terminals 112, 113 and 115 in the manner as provided in the IEEE 802.11 standards. In accordance with the preferred embodiment of the present invention, however, an AP broadcasts the power report request signal to all wireless terminals to access the AP and receives the power report signals from individual wireless terminals. Therefore, after transmitting the power report request signal, the AP 111 waits a predetermined time to receive the power report signals from the wireless terminals 112, 113 and 115.

After a time-out period, the AP 111 adjusts its transmit power based on the power reports in step 308. The power adjustment can be performed as follows. If the AP 111 receives the power report signals from a plurality of wireless terminals, it detects a power report signal requesting the highest power among the power report signals and adds a value within some predetermined margin to the requested power. The AP 111 then determines its transmit power based on the sum. In step 310, the AP 111 wirelessly communicates with the wireless terminals 112, 113 and 115 using the determined optimum transmit power.

While not shown in FIG. 3, one of the wireless terminals 112, 113 and 115, or fourth terminal 114 can be disconnected from the AP 111 during the communication. The AP 111 stores initial power report values and activates a delete timer (not shown) to a predetermined value. The delete timer is set to the same value individually for the wireless terminals 112, 113 and 114. Upon receipt of data or signaling from the wireless terminals 112, 113 and 115, corresponding timers are reset to the predetermined value. If there is no response from a wireless terminal until expiration of its delete timer, that is, if a time-out signal is detected from the delete timer for the wireless terminal, the AP 111 performs a power adjustment operation based on the power report values except the power report value from the wireless terminal. For example, if a time-out signal is detected from a delete timer for the wireless terminal 115, the AP 111 deletes the power report value received from the wireless terminal 115 and performs the power adjustment as done in step 308. After calculating a new optimum power, the AP 111 communicates with wireless terminals using the optimum power. The same applies to the case where a time-out signal is detected from a delete timer for the wireless terminal 112 or 113.

If the AP 111 does not preserve the power report values, it again receives power report values from wireless terminals to access the AP 111 in steps 300 to 306 and performs the power adjustment operation in step 308.

If the fourth wireless terminal 114 is to access the AP 111, the AP 111 authenticates (associates) the wireless terminal 114, for communication, in step 312. The AP 111 then broadcasts a power report request signal in step 314. As described earlier, the power report request signal can be transmitted with the maximum transmit power of the AP 111. Also, the power report request signal is so configured as to request only the new wireless terminal to measure received power and report it to the AP 111. In step 316, the wireless terminal 114 measures received power in response to the power report request and transmits the power value to the AP 111. In step 318, the AP 111 performs a power adjustment operation based on the preserved power report values from the wireless terminals in communication and the new power report value from the new wireless terminal 114 in the same manner as in step 308.

After the above power adjustment, the wireless coverage of the AP 111 can be changed as denoted by reference numeral 320. If the wireless terminal 115 is the most remote one and the new wireless terminal 114 is at a shorter distance to the AP 111 than the wireless terminal 115, the transmit power adjusted in step 308 is maintained. However, if the wireless terminal 115 is disconnected from the AP 111 and the wireless terminal 113 has requested the highest power, the power adjustment is performed correspondingly. Also, if the wireless terminal 114 is newly connected to the AP 111, the power adjustment is performed according to the resulting situation. After the power adjustment, the AP 111 communicates with the connected wireless terminals using the optimum transmit power.

The description made so far applies to the situation where the AP 111 has an access list and stores power report values in the access list. Therefore, unless the power report values exist in the access list, the AP 111 transmits a power report request and receives power report signals each time a wireless terminal is added or deleted, and performs a power adjustment operation correspondingly. Hence, it is preferable to have the power report values in the access list.

Figure 4:
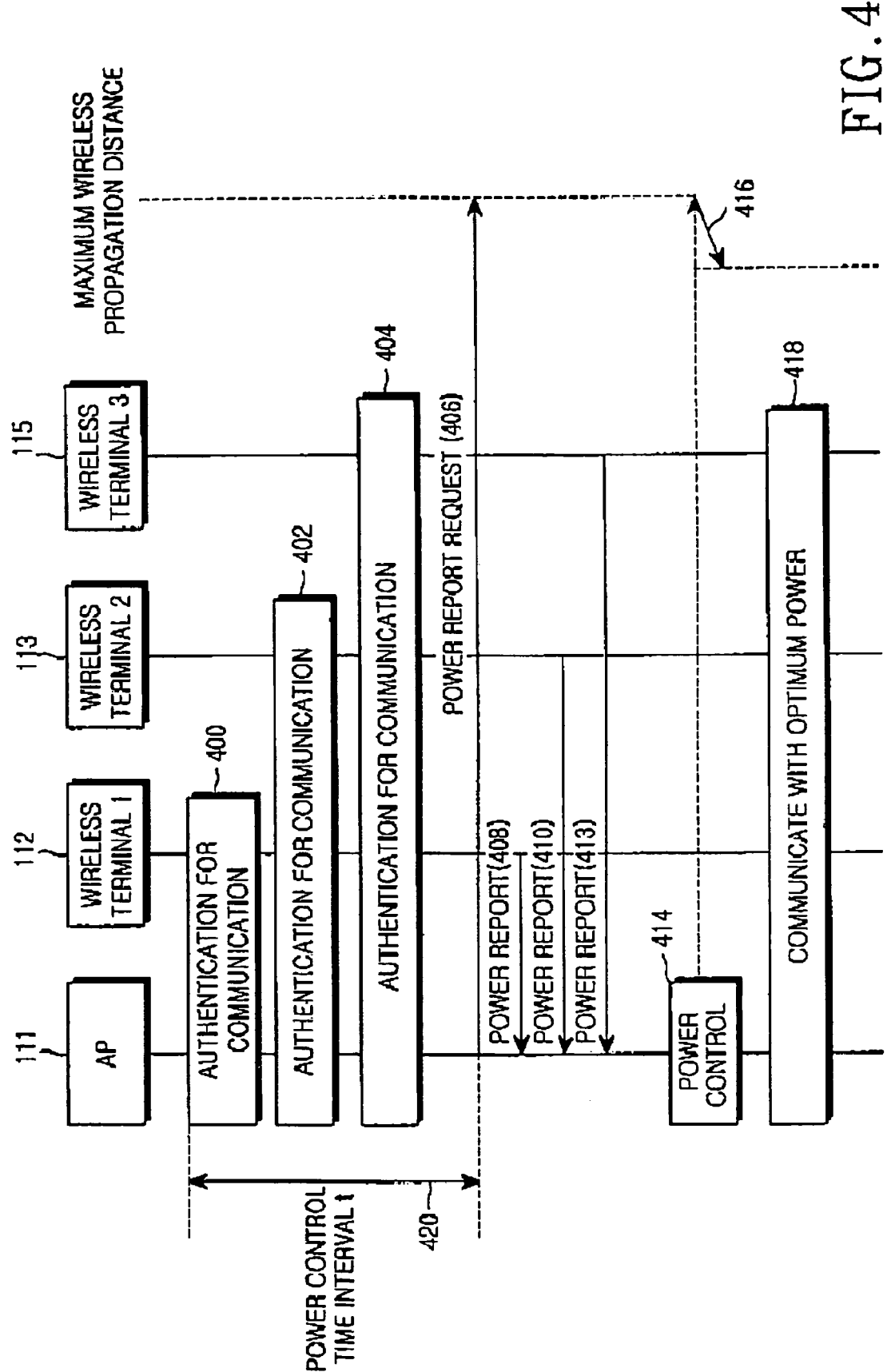
FIG. 4 is a diagram of a signal flow for a power adjustment operation based on control intervals according to another embodiment of the present invention.

FIG. 4 is a diagram illustrating a signal flow for performing a power adjustment operation at predetermined intervals according to another embodiment of the present invention. Referring to FIG. 4, the AP 111 authenticates the wireless terminal 112 that initially accesses the AP 111 in step 400. A power control time interval t 420 is preset for the AP 111. Thus, despite the completed authentication, the AP 111 does not transmit a power report request message until t elapses. Upon access request from the wireless terminal 113 before time-out, the AP 111 authenticates the wireless terminal 113 in step 402. If t still lasts after the authentication of the wireless terminal 113, the AP 111 can authenticate another wireless terminal 114 in step 404. While three wireless terminals are sequentially authenticated in the example illustrated in FIG. 4, if only one or two wireless terminals are authenticated, the AP 111 waits for the remaining time.

When t expires, the AP 111 transmits the power report request signal to a maximum propagation distance using its maximum available transmit power as in the procedure of FIG. 3, in step 406. In steps 408 through 413, the AP 111 receives power report signals from the wireless terminals 112, 113 and 115. The AP 111 adjusts its transmit power according to the power report signals in step 414 and communicates with the wireless terminals 112, 113 and 115 using the optimum power in step 418.

The power adjustment operation can be performed such that the power control time interval is valid during communication. That is, if the power control time interval expires during communication as illustrated in FIG. 3, the AP transmits a power report request signal to wireless terminals in communication with the AP, receives power report signals from them, and performs a power adjustment according to the power reports. The time interval-based power adjustment aims to allow an on-going communication to continue reliably despite the movement of wireless terminals within a household. If the power control time interval is applied to the initial access as illustrated in FIG. 4, the AP delays transmission of the power report request signal until a plurality of terminals access, thereby minimizing interference to other wireless terminals, that is, to wireless terminals in other neighbor households.

In accordance with the present invention as described above, unnecessary power consumption in an AP is prevented, thereby reducing interference to the wireless environments of neighbor households. Furthermore, adaptive power adjustment of an AP prevents information leakage to other terminals in a wireless LAN system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. In a wireless Local Area Network system having a wireless access node a plurality of wireless terminals, a power control method for the wireless access node, the method comprising:

receiving a request for initial communication from a wireless terminal;

transmitting a power report request message from the wireless access node to the plurality of wireless terminals;

receiving power report signals from connected wireless terminals among the plurality of wireless terminals in response to the report request message;

adjusting a transmit power of the wireless access node based on a power report signal requesting the highest power among the power report signals received from the connected wireless terminals; and communicating with the connected wireless terminals using the adjusted transmit power.

2. The power control method of claim 1, wherein receiving the power report signals includes storing values set in the power report signals for the connected wireless terminals in an access list, the stored values being used for the adjusting the transmit power.

3. The power control method of claim 2, further comprising:

determining a link between a wireless terminal and the wireless access node has been disconnected when no signals are received from the wireless terminal until a time-out signal is detected from delete timers set for the respective connected wireless terminals; and resetting the transmit power according to the highest of power levels requested by the connected wireless terminals.

4. The power control method of claim 1, wherein adjusting the transmit power includes determining the transmit power as the sum of the requested highest power and a predetermined margin.

5. The power control method of claim 1, further comprising:

transmitting a power report request signal to a new wireless terminal when the new wireless terminal requests a connection during communication between the wireless access node and the connected wireless terminals; and resetting the transmit power according to the highest of power values set in the power report signals from the connected wireless terminals and a power report signal from the new wireless terminal.

6. The power control method of claim 1, wherein the wireless access node waits a predetermined period of time after the initial communication is requested before transmitting the power report request message.

* * * * *